United States Patent
Sterbenz

(10) Patent No.: US 8,099,735 B2
(45) Date of Patent: Jan. 17, 2012

(54) METHOD AND SYSTEM FOR MODULE INITIALIZATION

(75) Inventor: Andreas Sterbenz, San Jose, CA (US)

(73) Assignee: Oracle America, Inc., Redwood City, CA (US)

(*) Notice: Subject to any disclaimer, the term of this patent is extended or adjusted under 35 U.S.C. 154(b) by 1060 days.

(21) Appl. No.: 11/962,949

(22) Filed: Dec. 21, 2007

(65) Prior Publication Data

US 2009/0165002 A1    Jun. 25, 2009

(51) Int. Cl.
  *G06F 3/00* (2006.01)
  *G06F 9/44* (2006.01)
  *G06F 9/46* (2006.01)
  *G06F 13/00* (2006.01)

(52) U.S. Cl. ............................... 719/310; 719/320; 713/1

(58) Field of Classification Search .................. 719/313, 719/330, 310, 320; 717/120; 713/1
See application file for complete search history.

(56) References Cited

U.S. PATENT DOCUMENTS

| | | | |
|---|---|---|---|
| 6,931,521 B2* | 8/2005 | Hubert et al. | 713/1 |
| 7,181,746 B2* | 2/2007 | Perycz et al. | 719/310 |
| 7,254,814 B1* | 8/2007 | Cormier et al. | 718/106 |
| 7,406,483 B2* | 7/2008 | Leymann et al. | 717/174 |
| 7,707,574 B2* | 4/2010 | Goring et al. | 718/100 |
| 7,865,872 B2* | 1/2011 | Chamieh et al. | 717/108 |
| 2002/0147903 A1* | 10/2002 | Hubert et al. | 713/1 |

OTHER PUBLICATIONS

OSGi Service Platform Core Specification, The OSGi Alliance, Release 4, Aug. 2005, pp. 1-268.
OSGi Service Platform Core Specification, The OSGi Alliance, Release 4, Version 4.0.1, Jul. 2006, pp. 1-266.
Sun Microsystems, Inc., JSR-277: Java™ Module System, Version 0.13, Apr. 19, 2007, pp. 1-116.

* cited by examiner

*Primary Examiner* — Diem Cao
(74) *Attorney, Agent, or Firm* — Osha • Liang LLP

(57) ABSTRACT

A method for initializing a module that includes identifying a module for initialization and performing a plurality of processing phases on the module and all modules in a dependency graph of the module. Performing the processing phases includes, for each module, executing a processing phase of the plurality of processing phases on the module, determining whether the processing phase has been executed on all modules in a dependency graph of the module, and when the processing phase has been executed for all modules in the dependency graph of the module, executing a subsequent processing phase of the plurality of processing phases on the module, wherein at least one processing phase of the plurality of processing phases includes executing custom initialization code.

13 Claims, 10 Drawing Sheets

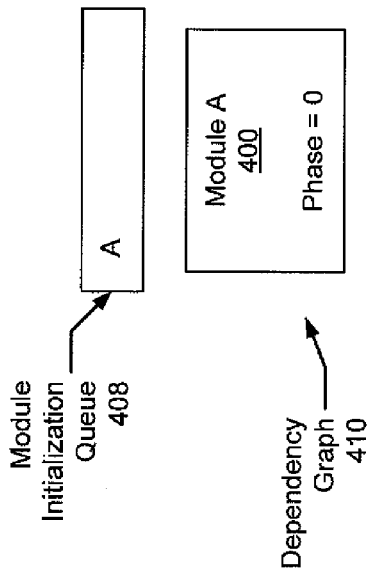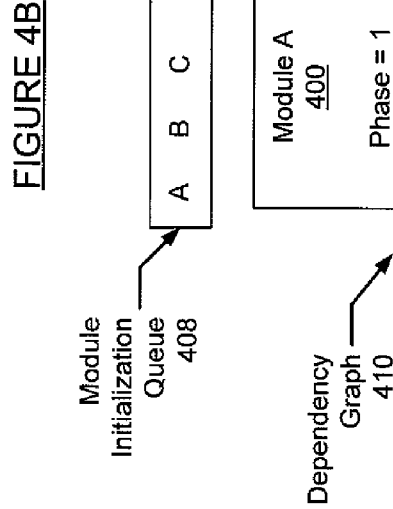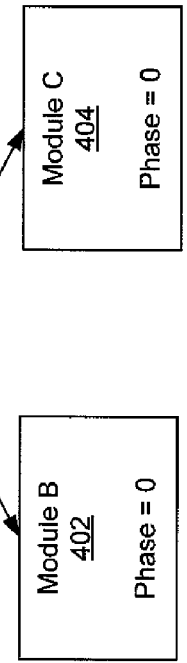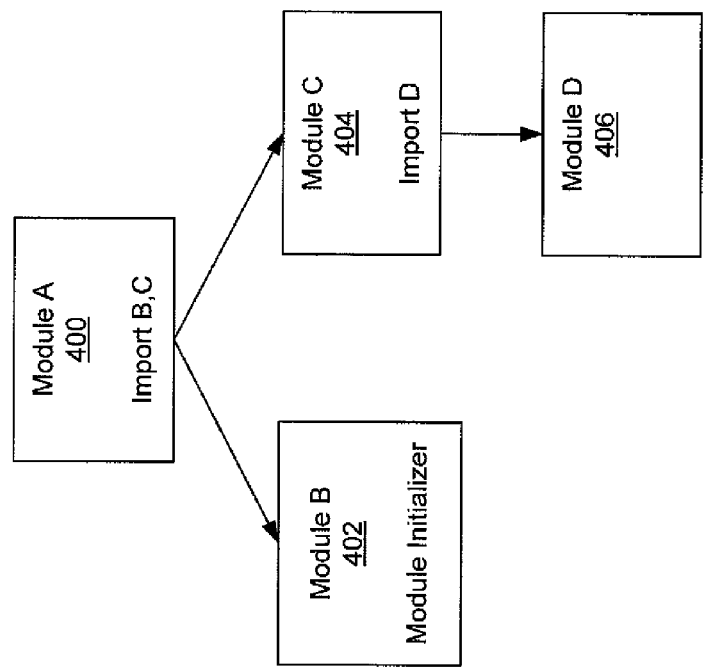

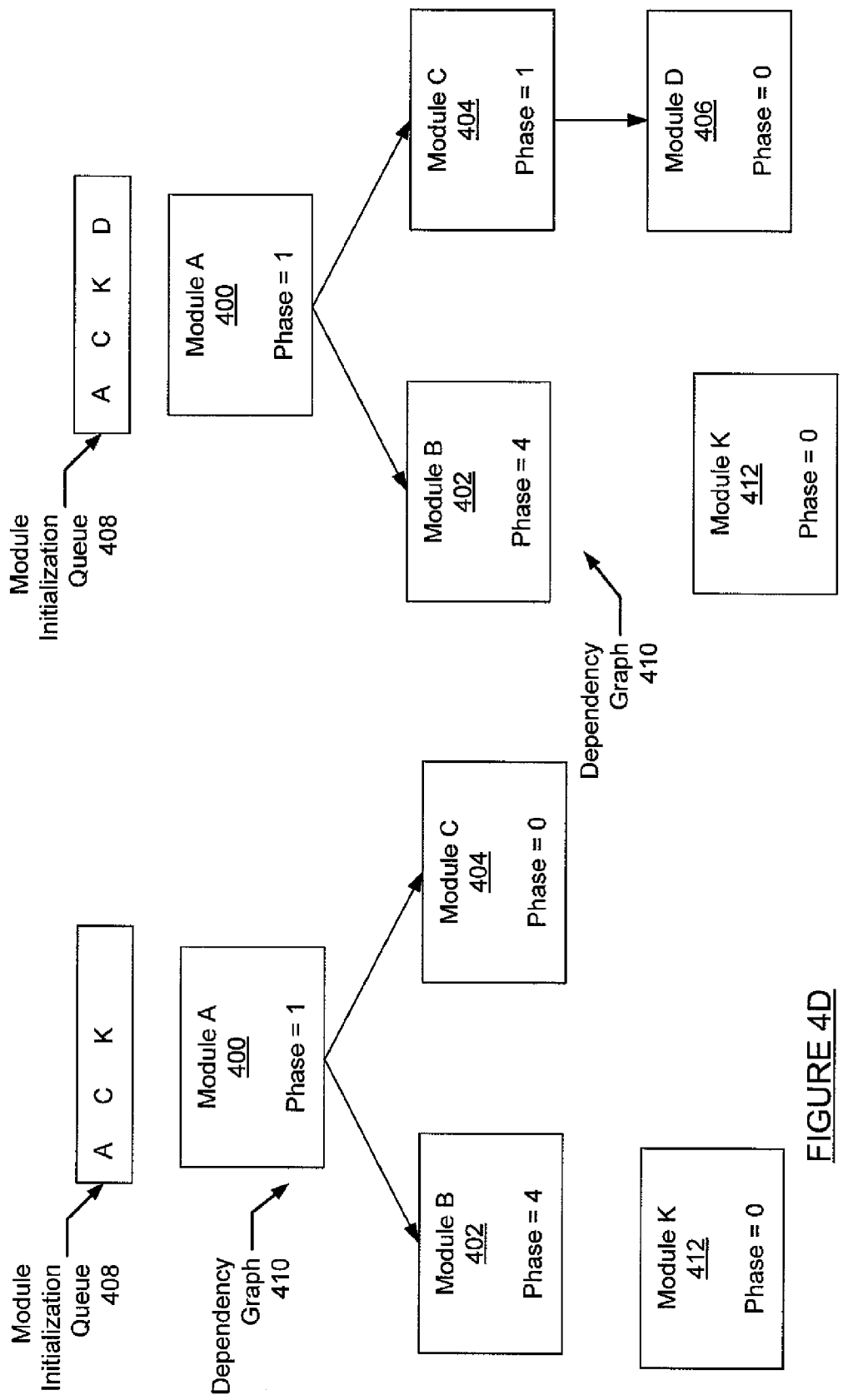

METHOD AND SYSTEM FOR MODULE INITIALIZATION

CROSS-REFERENCE TO RELATED APPLICATIONS

This application is related to U.S. application "Method and System for Module Initialization With An Arbitrary Number of Phases" with U.S. Pat. No. 7,934,084, which is incorporated by reference in its entirety.

BACKGROUND OF INVENTION

Software development and support costs are driven by many factors including increasing software complexity and the need to support multiple hardware platforms and operating systems. To help reduce these costs, there is an increasing emphasis on creating modular software solutions to allow reuse of software components (i.e., modules). Many different frameworks to support dynamic use of software components have been developed to meet these needs. Examples of such frameworks include the Java™ Module System (JAM), the OSGi™ Service Platform, the Microsoft® .NET Framework, the Apache Software Foundation Maven, and the Sun Microsystems NetBeans™. Java™ and NetBeans™ are trademarks of Sun Microsystems, Inc. OSGi™ is a trademark of The OSGi Alliance.

While specific implementation details and programming languages supported may vary, module frameworks share a number of common features. Functionality included in a module framework may include a runtime engine, module life cycle management, one or more module repositories, and module version management. This functionality allows "off the shelf" software modules to be reused and integrated into applications coherently and to be dynamically added, updated, and removed from the framework. In addition, modules may dynamically discover and cooperate with each other.

In module frameworks, a given module may be defined to depend on multiple other modules, which may in turn, depend on yet other modules. More specifically, a module may export one or more interfaces that may be imported by other modules. As a result, when a module is instantiated by the framework, some initialization may need to be performed to ensure, among other things, that any modules on which that module depends are present (i.e., that the imported interfaces are available) and can also be instantiated, and that there are no conflicts among these modules (e.g., two modules export a class having the same name). This initialization process typically varies depending on the framework and the composition of the modules.

SUMMARY OF INVENTION

In general, in one aspect, the invention relates to a method for initializing a module. The method includes identifying a module for initialization, and performing a plurality of processing phases on the module and all modules in a dependency graph of the module. Performing the processing phases includes, for each module, executing a processing phase of the plurality of processing phases on the module, determining whether the processing phase has been executed on all modules in a dependency graph of the module, and when the processing phase has been executed for all modules in the dependency graph of the module, executing a subsequent processing phase of the plurality of processing phases on the module, wherein at least one processing phase of the plurality of processing phases includes executing custom initialization code.

In general, in one aspect, the invention relates to a module system that includes module storage configured to store a plurality of module definitions and a module initialization engine configured to initialize a module created from a module definition of the plurality of module definitions by performing a plurality of processing phases on the module and all modules in a dependency graph of the module. Performing the processing phases includes executing a processing phase of the plurality of processing phases on the module, determining whether the processing phase has been executed on all modules in a dependency graph of the module, and when the processing phase has been executed for all modules in the dependency graph of the module, executing a subsequent processing phase of the plurality of processing phases on the module, wherein at least one processing phase of the plurality of processing phases includes executing custom initialization code.

In general, in one aspect, the invention relates to a computer readable medium. The computer readable medium includes executable instructions to initialize a module by identifying a module for initialization, and performing a plurality of processing phases on the module and all modules in a dependency graph of the module. Performing the processing phases includes, for each module, executing a processing phase of the plurality of processing phases on the module, determining whether the processing phase has been executed on all modules in a dependency graph of the module, and when the processing phase has been executed for all modules in the dependency graph of the module, executing a subsequent processing phase of the plurality of processing phases on the module, wherein at least one processing phase of the plurality of processing phases includes executing custom initialization code.

Other aspects of the invention will be apparent from the following description and the appended claims.

BRIEF DESCRIPTION OF DRAWINGS

FIGS. 4A-4J show an example of module initialization in accordance with one or more embodiments of the invention.

DETAILED DESCRIPTION

Figure 1:
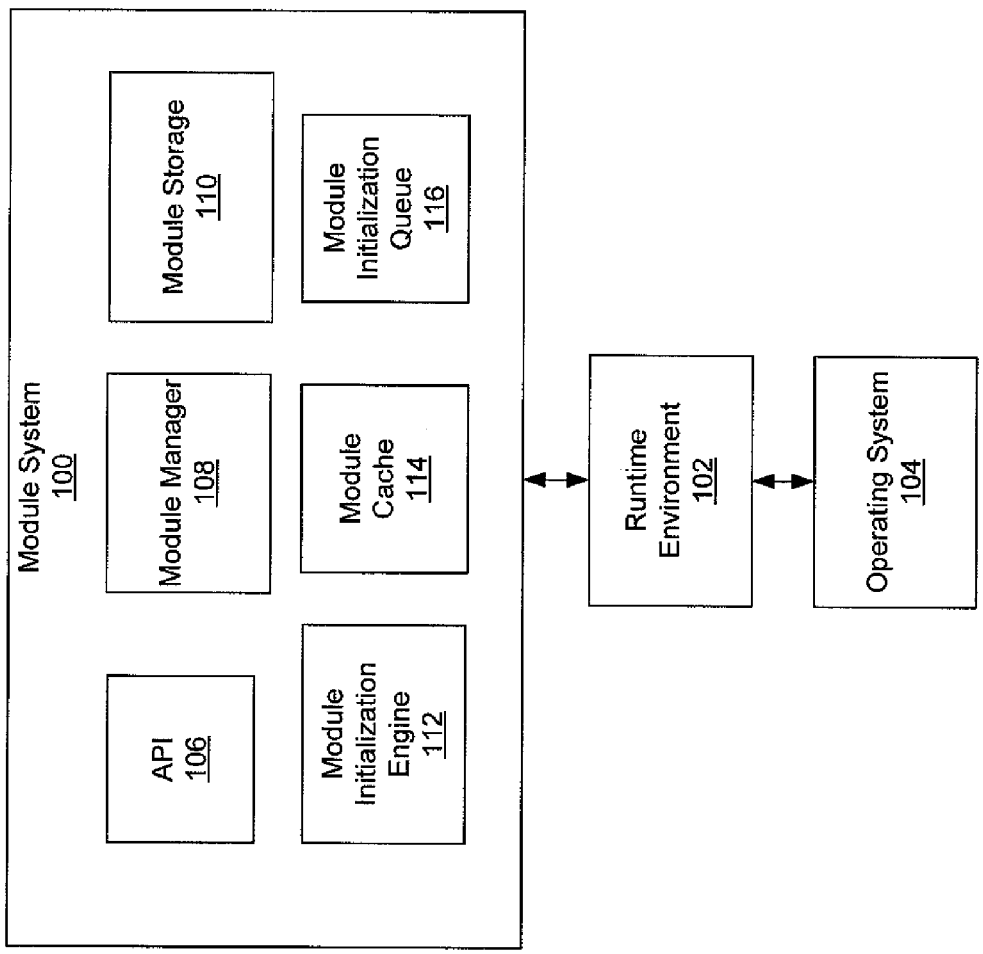
FIG. 1 shows a diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for initializing a module in a module system. More specifically, in one or more embodiments of the invention, when a module is selected for execution, the selected module and all modules on which the selected module directly or indirectly depends (i.e., dependent modules) are initialized by executing a sequence of processing phases on each of these modules (i.e., the selected module and the dependent modules). Each processing phase performs an operation on a module (e.g., identifying modules on which the module depends, verifying constraints, etc.). Further, in one or more embodiments of the invention, custom initialization code, i.e., executable code that is not part of and not under the direct control of the module system, may be executed in one or more of the processing phases. Execution of the custom initialization code may cause the initialization of one or more additional modules.

Further, each processing phase on each module is followed by a graph walking phase. The graph walking phase walks a graph of the transitive closure of the dependent modules of the module to verify that each of the dependent modules have completed the immediately preceding processing phase. The initialization of the module is not allowed to progress to the next processing phase until all of the dependent modules of that module have completed at least the same processing phase as the module. The originally selected module is successfully initialized when a graph walking phase executed on the selected module indicates that all modules in the dependency graph of the selected module have successfully progressed through all of the processing phases.

FIG. 1 shows a diagram of a system in accordance with one or more embodiments of the invention. Although the various components of the system, i.e., the module system (100), the runtime environment (102), and the operating system (104), are depicted in FIG. 1 as separate components, one of ordinary skill in the art will understand that these components may be combined in whole or in part. For example, in some embodiments of the invention, the module system (100) may be part of or may replace the runtime environment (102). Further, in some embodiments of the invention, the module system (100) may be part of the operating system (104). Accordingly, the specific arrangement of components shown in FIG. 1 should not be construed as limiting the scope of the invention.

As shown in FIG. 1, the system includes a module system (100), a runtime environment (102), and an operating system (104). The operating system (104) provides hardware interfaces and system functionality to software such as the runtime environment (102) and the module system (100) executing on a specific hardware platform (not shown). The operating system (104) may be any suitable operating system including, for example, Solaris™, UNIX®, Linux®, and the operating systems available from Microsoft and IBM. Solaris™ is trademark of Sun Microsystems, Inc. UNIX® is a registered trademark of The Open Group. Linux® is a registered trademark of Linus Torvalds.

The runtime environment (102) provides a software interface for executing applications such as the module system (100) and the modules included in the module system (100). In one or more embodiments of the invention, the runtime environment may be a software library for a specific programming language that provides functionality for interfacing with the underlying operating system (e.g., operation system (104)) when an application (e.g., the module system (100)) is executed. In such embodiments, the module system (100) is implemented in the programming language and the runtime environment (102) may be linked as a part with the compiled code of the module system (100). In one or more embodiments of the invention, the runtime environment may be a virtual machine that abstracts the underlying operating system (104) and hardware platform. Further, in one or more embodiments of the invention, the module system (100) may be implemented in Java and the runtime environment (102) may be a Java Virtual Machine.

The module system (100) is a framework for the development and deployment of module-based applications and libraries. The module system (100) provides, for example, a distribution format (i.e., a module definition) for packaging collections of functions or classes and any related resources along with information (i.e., metadata) describing the module to the framework, a versioning scheme for the modules, and runtime support for discovering, loading, integrity checking, and initializing modules. The module system (100) includes an application programming interface (API) (106), a module manager (108), module storage (110), a module initialization engine (112), a module cache (114), and a module initialization queue (116). Each of these components of the module system (100) is described in more detail below. Further, in one or more embodiments of the invention, the module system (100) may be the Java Module System as described in the Java Specification Request (JSR), JSR-277 available from the Java Community Process website.

The API (106) provides an interface for requesting various services from the module system (100). The module initialization queue (116) holds those modules that are currently being initialized by the module system (100). The module queue (116) may be implemented as any suitable data structure including, for example, a linked list, an array, and a circular buffer. The module cache (114) stores fully initialized and instantiated modules and modules that are in the process of being initialized. In one or more embodiments of the invention, the module cache (114) may be implemented in any form suitable for storing modules including, for example, one or more data structures in the memory of a computer system, one or more databases, and one or more files in a file system.

Module storage (110) stores module definitions for the modules configured for use with the module system. In one or more embodiments of the invention, the module definitions stored in module storage (110) may include module definitions provided by a vendor of the module system (100), module definitions developed by one or more users of the module system (100), and/or module definitions from third party vendors. A module definition is used to instantiate (i.e., create an instance of) the module it describes. In one or more embodiments of the invention, a module definition, for example, specifies what classes and resources are provided by a module, what functionality the module imports and exports, and the version of the module. In one or more embodiments of the invention, a module definition may also specify custom initialization code to be executed when a module is instantiated from the module definition and initialized by the module system. A module definition is described in more detail below in reference to FIG. 2. In one or more embodiments of the invention, module storage (110) may be, for example, one or more databases, file systems, file or database servers, any other suitable storage medium, and combinations thereof.

In one or more embodiments of the invention, module storage (110) may include one or more module repositories. A module repository is a mechanism for storing, discovering, and retrieving module definitions in the module system (100). Module repositories may include a bootstrap repository that exposes core platform module definitions, a global repository that exposes module definitions that may be shared by multiple processes, an application repository that exposes module definitions specific to an application, a URL repository that exposes module definitions stored on a server, and/or other user-defined repositories. A more detailed description of one example of module repositories may be found in JSR-277.

The module manager (108) includes functionality to receive requests from the API (106), interact with other parts of the module system (100) to fulfill the requests, and provide any results of fulfilling the requests to the API (106). The module manager (108) further includes functionality to manage the initialization of modules whose module definitions are stored in module storage (110). For example, in one or more embodiments of the invention, a request is made to the module system (100) through the API (106) to locate a specific module definition in module storage (110) using, for example, the module name or other information that identifies the module. A second request is then made to the module system (100) through the API (106) to request a module corresponding to the module definition from the module manager (108). The module manager (108) first checks the module cache (114) to see if the requested module has already been initialized or is in the process of being initialized. If the requested module is not in the module cache (114), the module manager (108) causes a module object to be created from the module definition and added to the module cache (114) and to the module initialization queue (116).

The module initialization engine (112) includes functionality to initialize the modules in the module initialization queue (116). More specifically, the module initialization engine (112) performs a multi-phase initialization process on each module in the module initialization queue (116). As is explained in more detail below in reference to FIGS. 3A and 3B, the multi-phase initialization process includes both processing phases and graph walking phases. In one or more embodiments of the invention, in the initialization process, each processing phase on a module is followed by a graph walking phase on the module. In addition, once a specific processing phase is performed on a module, the next processing phase in the initialization process is not executed on the module until all dependent modules of the module have successfully completed at least the specific processing phase. Further, in some embodiments of the invention, the processing phases in the initialization process are required to be executed in a specific order.

While the number of processing phases is not necessarily limited, in one or more embodiments of the invention, the number of processing phases may be predetermined. For example, some embodiments of the invention may include only two processing phases while other embodiments of the invention may include three processing phases, four processing phases, etc. In some embodiments of the invention, the number of processing phases performed may be application or module dependent. For example, the multi-phase initialization process may include some number of required processing phases and allow for one or more optional processing phases. In such embodiments, an optional processing phase may be performed upon request by an application that requests a module from the module system (100) and/or if indicated in a module definition. Thus, the number of processing phases performed on a module and its dependent modules may be dynamically determined at run-time.

A processing phase is a phase in which some initialization operation is performed on a module. An initialization operation may be, for example, identifying those modules on which a module depends and adding those dependent modules to the initialization queue if the dependent modules have not been initialized. An initialization operation may also be, for example, checking for namespace conflicts between dependent modules. Further, in one or more embodiments of the invention, an initialization operation may include the execution of custom initialization code. As is explained in more detail below in reference to FIG. 2, in some embodiments of the invention, custom initialization code may be included in the module definition of the module. In addition, in some embodiments of the invention, custom initialization code may be provided by an application that requests a module from the module system. In one or more embodiments of the invention, there are two possible outcomes to a processing phase: the module progresses to the graph walking phase or the module is marked to indicate that the processing phase did not complete successfully (e.g., the module is marked as being in an error state).

In some embodiments of the invention, a particular processing phase may be designated as a processing phase in which custom initialization code is to be executed on a module, if such custom initialization code is provided. For example, if the multi-phase initialization process includes three processing phases, the third processing phase may be designated as the processing phase for performing custom initialization code such as, for example, custom initialization code included in the module definition of the module. Further, in some embodiments of the invention, a processing phase for executing some types of custom initialization code, such as, for example, custom initialization code provided by an application when requesting a module may be dynamically added to the multi-phase initialization process as needed.

The graph walking phase that follows each processing phase is used to determine whether the next processing phase can be performed on the module, i.e., that all dependent modules of a module have successfully completed at least the same processing phase as the module. In one or more embodiments of the invention, a graph walking phase walks the graph of the transitive closure of a module's dependent modules to verify that each of the dependent modules has successfully completed at least the same processing phase as the module.

In one or more embodiments of the invention, there are four possible outcomes of a graph walking phase: 1) if any processing phase was not successfully completed on a dependent module, the module is marked to indicate that the module cannot be successfully initialized (e.g., the module is marked as being in an error state) and initialization of the module is aborted; 2) if all dependent modules have completed at least the same processing phase as the module, the next processing phase is performed on the module; 3) if all dependent modules have completed at least the same processing phase as the module and all processing phases have been completed on the module, the module is marked to indicate successful initialization and is removed from the module initialization queue (116); and 4) if all dependent modules have not completed at least the same processing phase, the module is marked to indicate that the processing phase has been completed on the module, the module initialization engine (112) selects the next module in the module initialization queue (116) to process, and the graph walking phase is repeated the next time the module initialization engine (112) selects the module from the module initialization queue (116) for processing.

Figure 2:
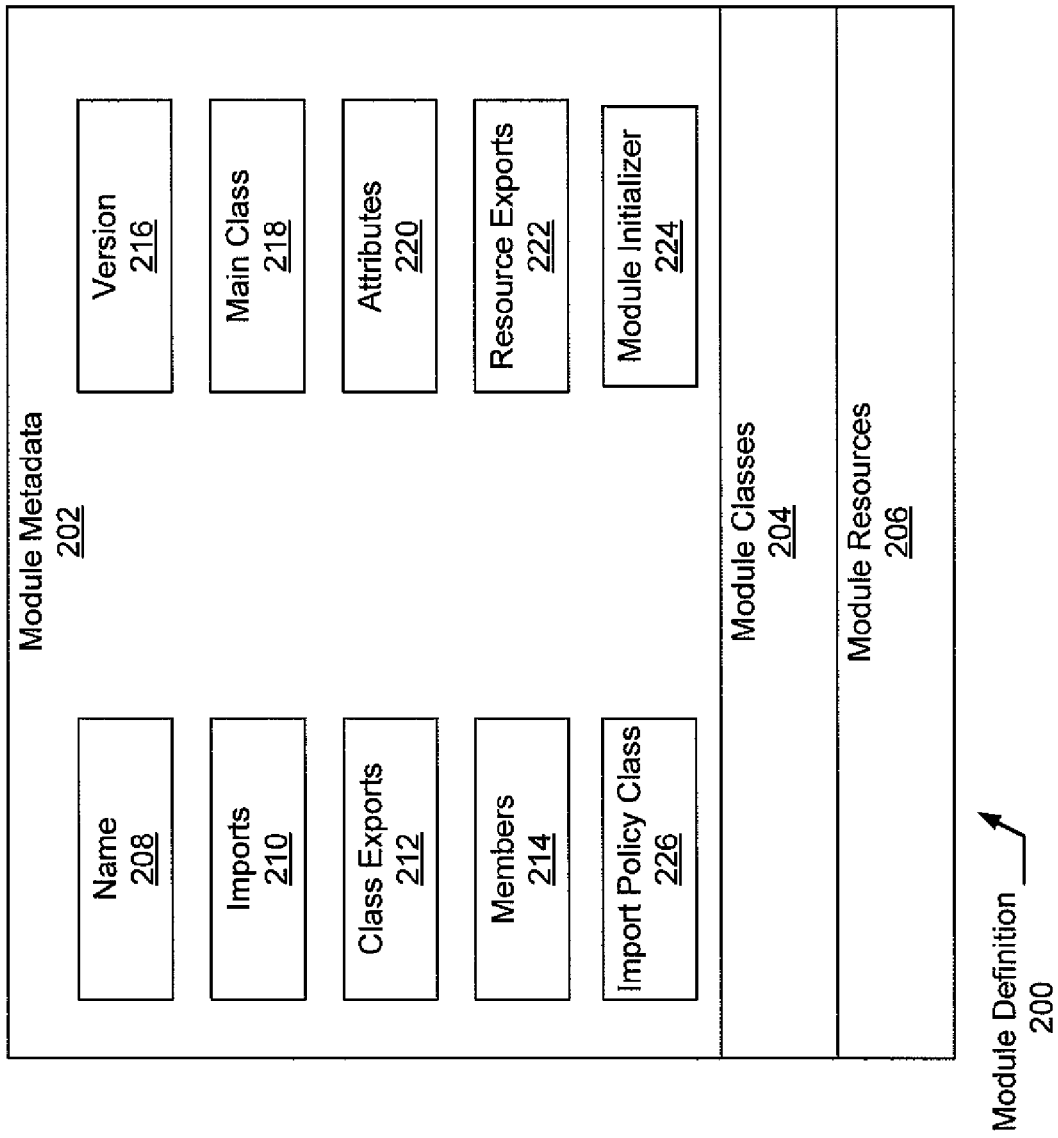
FIG. 2 shows a diagram of a module in accordance with one or more embodiments of the invention.

FIG. 2 shows a module definition (200) in accordance with one or more embodiments of the invention. A module definition (200) may include module metadata (202), module classes (204), and module resources (206). Module classes (204) are the executable code of the module. Module resources (206) are the resources (e.g., data) used by the module. Resources may be in the form of, for example, image files, audio files, text files, or any other data file used by the module.

Module metadata (202) includes information about the module that may be needed for initialization and instantiation of the module and/or for other modules to be able to use the module. In one or more embodiments of the invention, module metadata may include a name (208) of the module, the imports (210) and class exports (212) of the module, and the members (214) of the module. The name (208) may be a text string or any other suitable identifier for the module. The imports (210) specify the modules that are imported by the module. More specifically, the imports (210) identify those modules on which a module instantiated from the module definition (200) directly depends. In one or more embodiments of the invention, the imports (210) are used by the module initialization engine (112 of FIG. 1) to identify the direct dependent modules of a module during a processing phase.

The class exports (212) specify which of the classes in the module classes (204) are visible to other modules, i.e., may be called by other modules. In one or more embodiments of the invention, the class exports (212) may also identify classes that are re-exported by the module, i.e., classes that are imported from another module and then exported by the module. In one or more embodiments of the invention, the class exports (210) are used by the module initialization engine (112 of FIG. 1) to check for naming conflicts between modules during a processing phase. The members (214) identify the classes that are part of the module.

In one or more embodiments of the invention, the module metadata (202) may also include one or more of a version (216), a main class (218), attributes (220), resource exports (222), a module initializer (224), and an import policy class (226). The version (216) specifies the version of the module represented by the module definition (200). The main class (218) identifies a class of the module classes (204) that is an entry point for the module, i.e., the initial class to be called to start execution of the module. The resource exports (222) identify those resources of the module resources (206) that are exported (i.e., made visible) by the module. In one or more embodiments of the invention, a resource may be identified by a path name of the file storing the resource. In one or more embodiments of the invention, the resource exports (222) may also identify resources that are re-exported by the module, i.e., resources that are imported from another module and then exported by the module.

The attributes (220) are used to specify extensions to the module metadata (202). In more or more embodiments of the invention, an attribute may be a name-value pair of text strings that uniquely identify the attribute and provide a value for the attribute. The attributes (220) may be defined and used by other modules in the module system (100 of FIG. 1). Further, the presence of a particular attribute defined by another module in the module metadata (202) indicates that the module provides a feature of interest to the other module. For example, a service loader module may define a service provider attribute that is to be included in modules that contain service providers. At run time, when a service is requested by the service loader, the module system (100 of FIG. 1) can then discover the available service providers by looking in the module storage (110 of FIG. 1) for those modules that include the service provider attribute in their module metadata.

The module initializer (224) and the import policy class (226) each specify custom initialization code to be executed in processing phases of the multi-phase initialization process described herein. In one or more embodiments of the invention, the module initializer (224) specifies a class or function to be called to perform initialization operations specific to the module. Such initialization operations may include, for example, reading of configuration files, establishing a connection with a database, registering with system services, setting up a network service to allow other applications to interact with the module, etc. In one or more embodiments of the invention, the custom initialization code specified by the module initializer (224) is executed in a specifically designated processing phase of the multi-phase initialization process. For example, the multi-phase initialization process may include three processing phases in which the first processing phases identifies dependent modules, the second processing phase checks type conflicts between dependent modules, and the third processing phase executes the custom initialization code of a module, if any, specified in the module initializer (224).

In one or more embodiments of the invention, the import policy class (226) specifies a class or function that provides a custom policy for importing dependent modules. The custom import policy allows a module to specify custom requirements for importing modules. Examples of custom import requirements include, but are not limited to, specifying that the version of an imported module must be a specific version or within a range of versions, specifying that a specific version(s) of a module should not be imported, specifying that a module to be imported must include certain attributes, and/or specifying the specific processing platform an imported module must execute on. In one or more embodiments of the invention, the import policy class (226), if provided, is invoked in a processing phase specifically designated for identifying the direct dependent modules of a module.

Figure 3A:
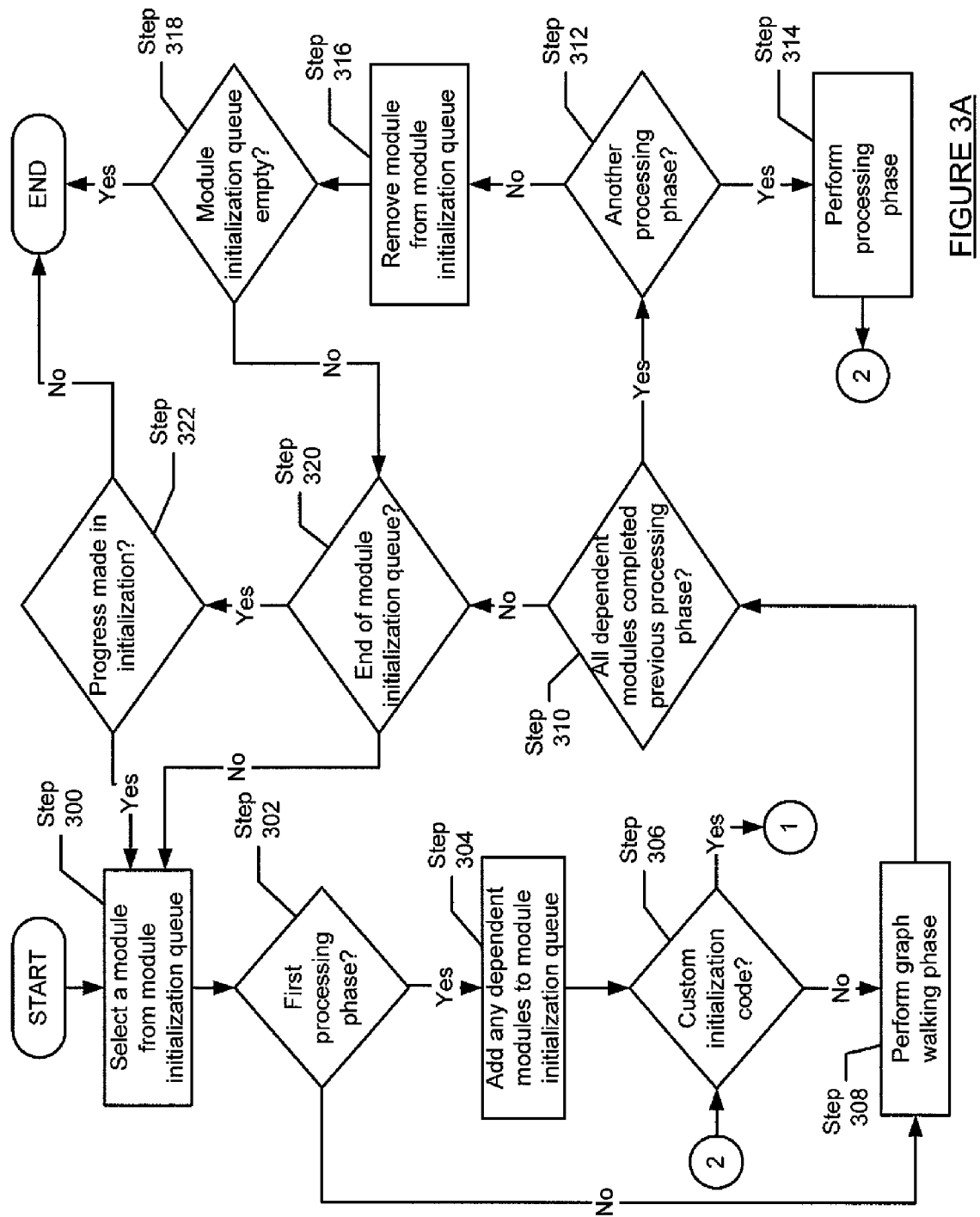
FIGS. 3A and 3B show a flowchart of a method for initializing a module in accordance with one or more embodiments of the invention.
Figure 3B:
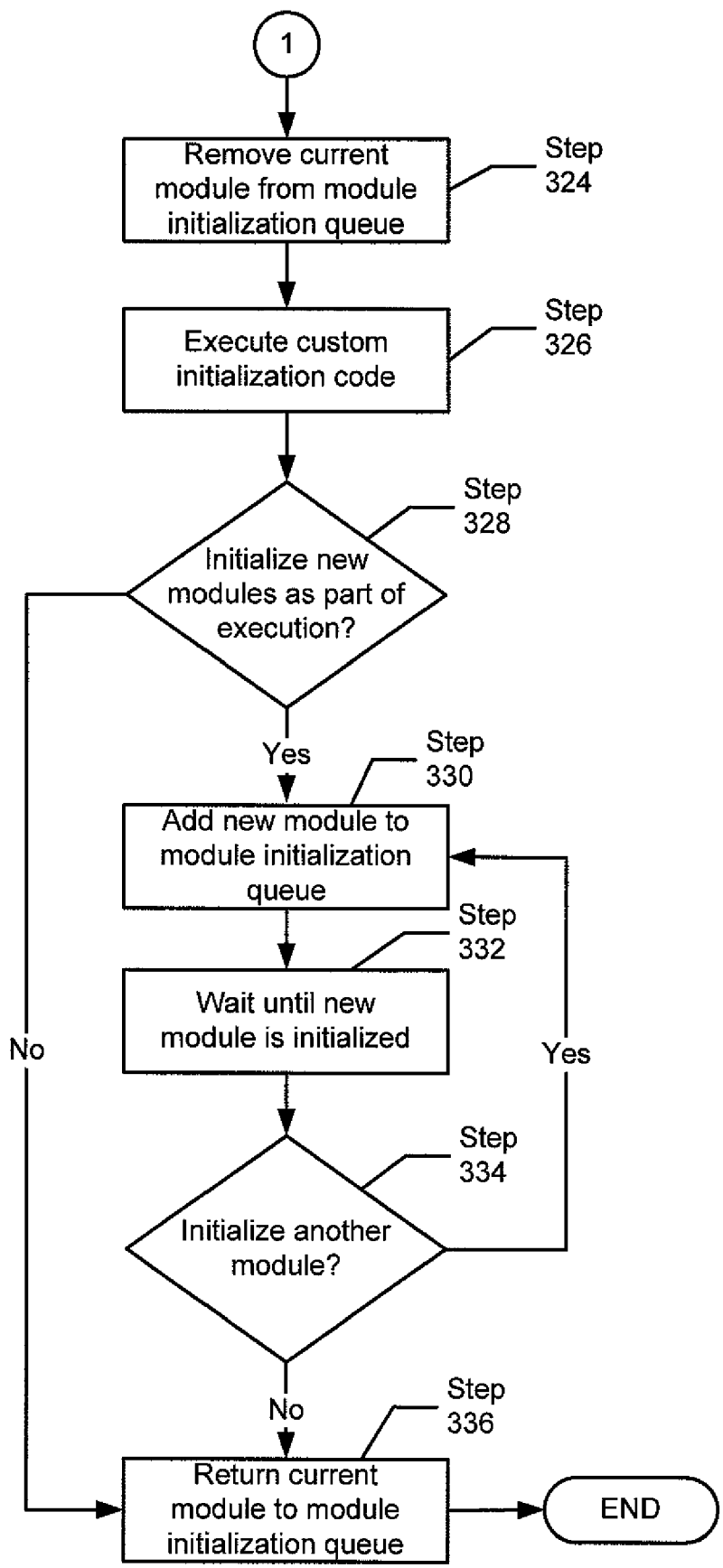

FIGS. 3A and 3B are flow diagrams of a method for module initialization in accordance with one or more embodiments of the invention. In one or more embodiments of the invention, one or more of the steps shown in FIGS. 3A and 3B may be omitted, repeated, performed in parallel, and/or performed in a different order. Accordingly, the specific arrangement of steps shown in FIGS. 3A and 3B should not be construed as limiting the scope of the invention. Furthermore, in order to simply the flow diagram, some error checking steps are not explicitly shown. However, one of ordinary skill in the art will understand that such steps may be included.

As previously mentioned, module initialization is a multi-phase initialization process that is performed on a module and all modules in a dependency graph of the module, i.e., all modules on which the module may directly or indirectly depend. Further, the multi-phase initialization process includes processing phases and graph walking phases that are performed on each of these modules.

In one or more embodiments of the invention, each module may include or have associated with it a status indicator that indicates the initialization status of the module. More specifically, the status indicator may indicate which phase of the initialization process has most recently been completed on the module. In one or more embodiments of the invention, each phase is identified by an integer (e.g., 0, 1, 2, 3, 4 . . . ) with the processing phases assigned odd integers, the graph walking phases assigned even integers, and a phase number of 0 indicating that no processing phase has been performed. Accordingly, the status indicator of a module may store the number of the phase most recently completed. For simplicity of explanation, the flow diagram of FIG. 3 may be described below assuming that the phases are so identified. However, other approaches for indicating the initialization status of a module may be used without departing from the scope of the invention and the focus on one particular approach should not be interpreted as limiting the invention in any way.

In one or more embodiments of the invention, the module initialization process does not permit a dependency cycle between a module and other modules initialized as the result of executing custom initialization code (described in more detail below) during the initialization of the module. Accordingly, the module initialization process may include steps to detect such dependency cycles. For example, in one or more embodiments of the invention, the module initialization process monitors the module initialization queue to determine if progress is being made in initializing the modules in the queue. More specifically, when initially started, the module initialization process may set a progress indicator (e.g., a Boolean variable) to indicate that no progress has been made in initializing any module in the queue. Then, as is explained in more detail below, after any module successfully completes a processing phase or a graph walking phase and is allowed to progress to the next phase, or if a module is moved to an error state, the progress indicator is set to indicate that initialization progress has been made.

Each time the module initialization process reaches the end of the module initialization queue, the module initialization process checks the progress indicator. If the progress indicator indicates that progress has been made, the module initialization process then sets the progress indicator to indicate no progress, selects the first module in the queue, and continues the initialization process. If no progress has been made, all modules remaining in the module initialization queue are marked to indicate that they were not successfully initialized (i.e., are moved to an error state) and the module initialization process terminates. The module initialization process is designed such that at least one module should make progress in each pass through the module initialization queue unless there is a dependency cycle between a module and any module that is initialized as part of executing custom initialization code for that module.

In one or more embodiments of the invention, a module that is to be initialized is added to a module initialization queue (e.g., the module initialization queue (116) of FIG. 1). More specifically, in one or more embodiments of the invention, a module definition (e.g., module definition (200) of FIG. 2) may be retrieved from a module repository in module storage (e.g., module storage (110) of FIG. 1), a module object (i.e., a module instance) may be created using the module definition, and the module instance (i.e., the module) may be added to the module initialization queue to be initialized. Further, an initialization status may be associated with the module. More specifically, a status indicator for the module may be set to 0 to indicate that no processing phase has been performed on the module.

Referring now to FIG. 3A, the initialization process for a module begins when the module is selected from the module initialization queue (Step 300). When a module is selected from the module initialization queue, a check is made to determine whether the initial processing phase has been performed on the module (Step 302). In one or more embodiments of the invention, if the status indicator of the retrieved module is 0, the initial processing phase has not been performed.

If the first processing phase has not been performed on the module, that first processing phase is performed (Step 304). In one or more embodiments of the invention, in the initial processing phase, any modules on which the module directly depends are identified. In one or more embodiments of the invention, the dependent modules are the modules imported by the module. In some embodiments of the invention, the dependent modules are specified in the metadata of the module definition (e.g., imports (201) in FIG. 2). Each dependent module that has not been previously initialized or that is not currently undergoing initialization is added to the module initialization queue, with a status indicator of 0. Any of the dependent modules that have already been initialized or are currently being initialized may be stored in a module cache (e.g., the module cache (114) of FIG. 1) with status indicators indicating the initialization phase last completed on those modules.

In one or more embodiments of the invention, custom initialization code may be executed as part of the initial processing phase (Step 306). If custom initialization code is not executed (Step 306), in one or more embodiments of the invention, the status indicator of the module is set to indicate that the first phase has been completed on the module and the next step, Step 308, is performed. Further, in one or more embodiments of the invention, a progress indicator is set to indicate that progress has been made.

In some embodiments of the invention, the custom initialization code is code that specifies custom requirements for determining the modules to be imported (e.g., the import policy class (226) of FIG. 2). In some embodiments of the invention, the custom initialization code, i.e., custom import code, may be executed to augment the explicit designation of imported, i.e., dependent, modules. For example, the module metadata may include both an explicit designation of imported modules and custom import code, and both will be used during the initial processing phase. In other embodiments of the invention, either imported modules are explicitly designated or custom import code is provided. In yet other embodiments of the invention, the custom import code may override any explicit designation of imported modules.

As is shown in FIG. 3B, if custom initialization code is to be executed, the current module, i.e., the module for which the custom initialization code is being executed, is removed from the module initialization queue (Step 324). Then, the custom initialization code is executed (Step 326). As part of executing this custom initialization code, one or more new modules may need to be initialized, for example, because the custom initialization code uses an API (e.g., API (106) of FIG. 1) to request a module from a module system (e.g., module system (100) of FIG. 1) (Step 328). If one or more new modules do not need to be initialized, the current module is returned to the module initialization queue (Step 334) after the custom initialization code is executed and the process continues with the next step (Step 308) in FIG. 3A. In one or more embodiments of the invention, the status indicator of the current module is set to indicate that the processing phase has been completed on the module. Further, in one or more embodiments of the invention, a progress indicator is set to indicate that progress has been made.

In one or more embodiments of the invention, if one or more new modules are to be initialized, the module initialization process detects a recursive invocation for each module to be initialized. The new module is added to the module initialization queue (Step 330) and the process waits until the return from the recursive invocation, i.e., until the new module is initialized (Step 330). More specifically, adding the new module to the module initialization queue causes the new module to be initialized using the module initialization process described in FIGS. 3A and 3B. In one or more embodiments of the invention, the new module is added to the module initialization queue, a status indicator for the new module is set to 0 to indicate that no processing phase has been performed on the new module, and the module initialization process is recursively invoked.

The recursively invoked module initialization process continues processing each module in the module initialization queue as described herein. The recursive invocation is terminated when the new module is either successfully initialized or a determination is made that the new module cannot be initialized. For example, after any module is successfully initialized, the module initialization process may check to determine if that module is the module that caused the recursive invocation. If the successfully initialized module is the one that caused the recursive invocation, the recursive invocation is terminated.

The initialization of modules in the custom initialization code continues until all are initialized (Step 334-Step 336). Once the new modules are initialized, the custom initialization code completes execution and the current module is returned to the module initialization queue (Step 336). In one or more embodiments of the invention, the status indicator of the current module is set to indicate that the processing phase has been completed on the module. Further, in one or more embodiments of the invention, a progress indicator is set to indicate that progress has been made. The process continues with the next step (Step 308) in FIG. 3A.

Returning to FIG. 3A, upon successful completion of the first processing phase, a graph walking phase is performed (Step 308). Further, when a module is retrieved from the module initialization queue that has already had the first processing phase performed on it (Step 302), a graph walking phase is performed (Step 308). The graph walking phase walks the transitive closure of the dependency graph of the module to determine if the dependent modules of the module have progressed sufficiently to allow the next processing phase, if any, to be performed on the module. More specifically, the graph walking phase walks the dependency graph to determine whether the dependent modules have successfully completed at least the last processing phase that was successfully completed on the module. For example, if processing phase 1 has been successfully completed on the module, then the graph walking phase checks the dependent modules to determine if at least processing phase 1 has been successfully completed on those modules. In one or more embodiments of the invention, more processing phases may have been completed on a dependent module than on the module that depends on it.

If all of the dependent modules have completed at least the processing phase previously completed on the module (Step 310), then the initialization process for that module may advance to the next processing phase, if any. If all of the processing phases have been successfully completed on the module (step 312), the status indicator of the module may be set to indicate that the module is completely initialized and the module may be removed from the module initialization queue (Step 316). In one or more embodiments of the invention, the status indicator is set to the integer representing the final graph walking phase of the initialization process to indicate successful initialization. Further, in one or more embodiments of the invention, a progress indicator is set to indicate that progress has been made.

If the module initialization queue is empty (step 318), the module initialization process terminates. In one or more embodiments of the invention, termination may include notifying an application that request initialization of a module that the initialization is complete.

If the module initialization queue is not empty (Step 318), a check is made to determine if the end of the module initialization queue has been reached (Step 320). If the end of the module initialization queue has not been reached, the next module is selected from the module initialization queue for processing (Step 300). If the end of the module initialization queue has been reached, a check is made to determine if progress has been made in initializing any module in the module initialization queue (Step 322).

In one or more embodiments of the invention, a progress indicator is checked. As explained above, the progress indicator is set to indicate no progress before processing the first module in the module initialization queue and is set to indicate progress if any module successfully completes a processing step or successfully completes the entire initialization process during a pass through the module initialization queue. If no progress is indicated, the module initialization process is terminated. In one or more embodiments of the invention, each module remaining in the module initialization queue is marked as not being successfully initialized before the initialization process is terminated. If progress has been made, the progress indicator is set to indicate no progress, and the next module in the module initialization queue, i.e., the first module, is selected from the module initialization queue for processing (Step 300).

Referring back to Step 312, if all processing phases have not been completed on the module, the next processing phase is performed on the module (Step 314). In one or more embodiments of the invention, the processing phase may include the execution of custom initialization code (Step 306). If custom initialization code is to be executed, the processing continues as described above in reference to FIG. 3B. The custom initialization code may be, for example, a module initializer class specified in the module definition of the module or initialization code specified by an application when requesting a module.

If custom initialization code is not to be executed (Step 306), the status indicator of the module is set to indicate completion of the processing phase. In one or more embodiments of the invention, the status indicator is set to the integer representing the processing phase completed. For example, if processing phase 3 is performed, the status indicator is set to 3. Further, in one or more embodiments of the invention, a progress indicator is set to indicate that initialization progress has been made. Another graph walking phase is then performed on the module (Step 308). The cycle of performing a graph walking phase and a processing phase on the module (Steps 306-314) continues until either there are no more processing phases to be performed (Step 314) or the processing phase performed on the module prior to the graph walking phase has not been completed on the dependent modules (Step 310).

If all of the dependent modules have not completed at least the processing phase previously completed on the module (Step 310), then processing continues at Step 320 as described above. In one or more embodiments of the invention, the status indicator of the module is set to indicate that a graph walking phase should be performed on the module the next time the module is selected from the module initialization queue.

In one or more embodiments of the invention, a module is successfully initialized when all phases of the multi-phase initialization process have been successfully performed on the module and any modules on which the module directly or indirectly depends. Further, in one or more embodiments of the invention, the number of processing phases in an initialization process is arbitrary. More specifically, the above described methods and systems for initialization do not limit the number of processing phases that may be included in embodiments of the invention. However, in some embodiments of the invention, the number of processing phases may be predetermined.

FIGS. 4A-4J show an example of module initialization in accordance with one or more embodiments of the invention. This example is presented for illustration purposes only and should not be interpreted as limiting the scope of the invention in any way. In the example of FIGS. 4A-4J, the multi-phase initialization process includes three processing phases, phase 1, phase 3, and phase 5 and three graph walking phases, phase 2, phase 4, and phase 6. Further, processing phase 1 identifies direct dependent modules of a module and enqueues for initialization any of the identified direct dependent modules that are not already initialized or in the process of being initialized. Processing phase 3 performs name conflict checks on the direct dependent modules of a module. Processing phase 5 executes custom initialization code, if any, provided as a module initializer class specified in the module definition of a module. For purposes of this example, the assumption is made that none of the modules are already initialized or in the process of being initialized.

Figure 4G:
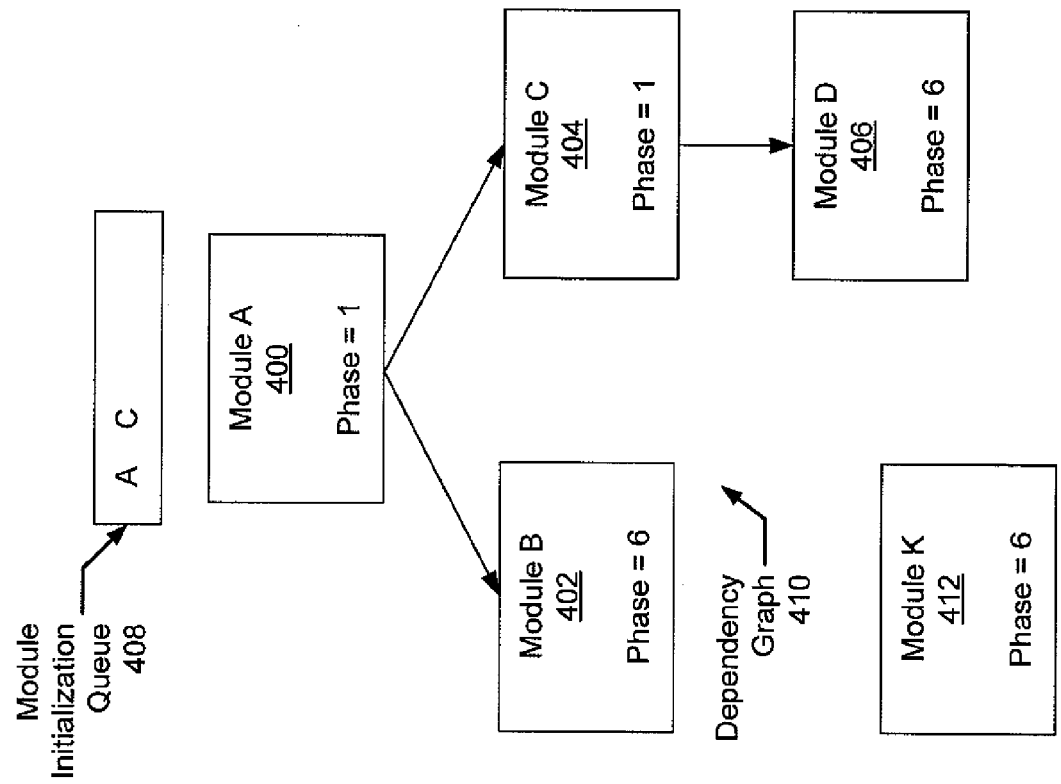

The example in FIGS. 4A-4J illustrates the application of the multi-phase initialization process in initializing module A (400). FIG. 4A shows the dependencies of module A (400). Module A (400) imports module B (402) and module C (404) so module A directly depends on module B (402) and module C (404). Module B (402) does not import another module so module D has no direct dependencies. Module C (404) imports module D (404) so module C directly depends on module D (404) and module A (400) indirectly depends on module D (404). Module D (404) does not import another module so module D has no direct dependencies. In addition, only Module B (402) specifies a module initializer class.

As is shown in FIG. 4B, when initialization of module A (400) is requested, the status indicator, labeled as "Phase" in FIGS. 4B-4J, of module A (400) is set to 0 to indicated that no phase of the initialization process has been performed module A (400). In addition, module A is added to the module initialization queue (408). A progress indicator Boolean flag (not shown) is also set to False to indicate that no initialization progress has been made. At this point in the initialization process, the dependent modules of module A (400) have not been identified so the dependency graph (410) of module A (400) includes only module A (400).

Subsequently, the initialization process selects module A (400) from the module initialization queue (408) and phase 1, a processing phase, is successfully performed on module A (400) followed by the first graph walking phase, phase 2. The progress indicator flag is also set to True to indicate that initialization progress has been made. As is shown in FIG. 4C, after phases 1 and 2 are performed, the direct dependent modules of module A (400), i.e., module B (402) and module C (404) have been identified and placed in the module initialization queue (408) to be initialized. Further, the status indicators of both module B (402) and module C (404) have been set to 0 to indicate that no phase of the initialization process has been performed on these modules. In addition, the status indicator of module A (400) has been set to 1 to indicate that phase 1 was successfully completed on module A (400).

After the execution of phase 1, the dependency graph (410) of module A (400) now includes module B (402) and module C (404). When the graph walking phase, phase 2, is performed on the transitive closure of the dependency graph of module A (400), the outcome indicates that phase 1 has not yet been performed on either module B (402) or module C (404). Therefore, module A (400) is not permitted to advance to the next processing phase in the initialization process. Accordingly, the initialization process moves to the next module in the module initialization queue (408).

The initialization process thus selects module B (402) from the module initialization queue (408). Phase 1 is successfully performed on module B (402) followed by the first graph walking phase, phase 2. When the graph walking phase, phase 2, is performed on the transitive closure of the dependency graph of module B (402), the outcome is clearly that phase 1 has been performed on all dependent modules of module B (402) as module B (402) has no dependent modules. Therefore, module B (402) is permitted to advance to the next processing phase in the initialization process, phase 3.

Phase 3 is performed on module B (402) in which any direct dependent modules of module B (402) are checked for name conflicts. Upon successful completion of phase 3, the second graph walking phase, phase 4, is performed on the transitive closure of the dependency graph of module B (402). The outcome of the phase 4 graph walk is clearly that phase 3 has been performed on all dependent modules of module B (402). Therefore, module B (402) is permitted to advance to the next processing phase in the initialization process, phase 5.

Phase 5 is performed on module B (402) in which a module initializer class, if one is specified, is to be executed. Module B (402) includes a module initializer class so module B (402) is removed from the module initialization queue (408) and the module initializer class is executed. During the execution of the module initializer class, a new module, module K (412) requires initialization. As shown in FIG. 4D, module B (402) is now gone from the module initialization queue (408) and module K (412) is added. Further, the status indicator of module B (402) is set to 4 to indicate that phase 4 was successfully completed on module B (402). The initialization process is recursively invoked to initialize module K (412) and moves to the next module in the module initialization queue (408).

The initialization process then selects the next module, module C (404) from the module initialization queue (408). Phase 1 is successfully performed on module C (404) followed by the first graph walking phase, phase 2. As is shown in FIG. 4E, after phases 1 and 2 are performed, the direct dependent module of module C (404), i.e., module D (406), is identified and added to the module initialization queue (408) for initialization. The status indicator for module D (406) has also been set to 0 to indicate that no phase of the initialization process has been performed on module D (406). Further, the status indicator of module C (404) has been set to 1 to indicate that phase 1 was successfully completed on module C (404).

After the execution of phase 1, the dependency graph (410) now includes module D (406). When the graph walking phase, phase 2, is performed on the transitive closure of the dependency graph of module C (404), the outcome is that phase 1 has not been performed on module D (406). Therefore, module C (404) is not permitted to advance to the next processing phase in the initialization process. Accordingly, the initialization process moves to the next module in the module initialization queue (408).

The initialization process then selects module K (412) from the module initialization queue (408). Phase 1 is successfully performed on module K (412) followed by the first graph walking phase, phase 2. When the graph walking phase, phase 2, is performed on the transitive closure of the dependency graph of module K (412), the outcome is clearly that phase 1 has been performed on all dependent modules of module K (412) as module K (412) has no dependent modules. Therefore, module K (412) is permitted to advance to the next processing phase in the initialization process, phase 3.

Phase 3 is performed on module K (412) in which any direct dependent modules of module K (412) are checked for name conflicts. Upon successful completion of phase 3, the second graph walking phase, phase 4, is performed on the transitive closure of the dependency graph of module K (412). The outcome of the phase 4 graph walk is clearly that phase 3 has been performed on all dependent modules of module K (412). Therefore, module K (412) is permitted to advance to the next processing phase in the initialization process, phase 5.

Figure 4F:
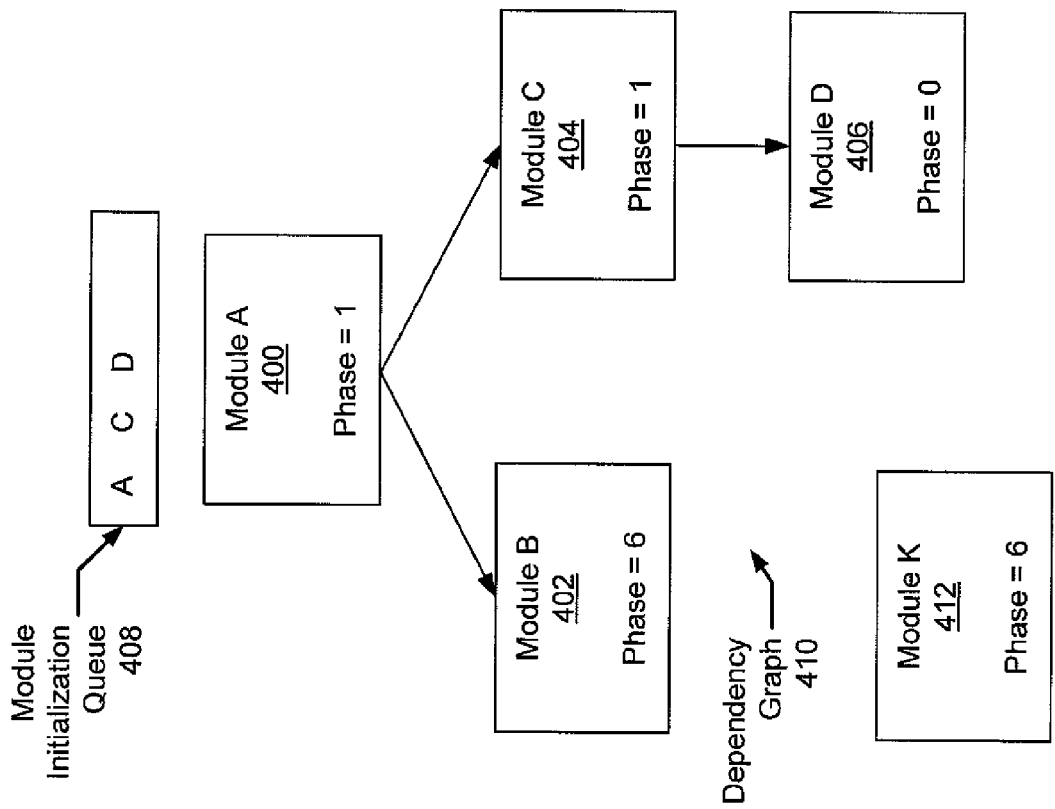

Phase 5 is performed on module K (412) in which a module initializer class, if one is specified, is to be executed. Module K (412) does not includes a module initializer class so none is executed. Upon successful completion of phase 5, the third graph walking phase, phase 6, is performed on the transitive closure of the dependency graph of module K (412). The outcome of the phase 6 graph walk is clearly that phase 5 has been performed on all dependent modules of module K (412). Therefore, module K (412) has successfully completed all of the initialization phases. As shown in FIG. 4F, module K (412) is removed from the module initialization queue (408). Further, the status indicator of module K (412) is set to 6 to indicate all phases of the initialization process have been successfully completed on module K (412). Since module K (412) is initialized, the recursive invocation of the initialization process is ended. Module B (402) is then returned to the module initialization queue (408). For purposes of this example, Module B (402) is placed in the module initialization queue in the location from which Module K (412) was removed, i.e., before module D (406).

The module initializer class for module B (402) completes execution, thus successfully completing the execution of phase 5 on module B (402). Upon successful completion of phase 5, the third graph walking phase, phase 6, is performed on the transitive closure of the dependency graph of module B (402). The outcome of the phase 6 graph walk is clearly that phase 5 has been performed on all dependent modules of module B (402). Therefore, module B (402) has successfully completed all of the initialization phases. Module B (402) is removed from the module initialization queue (408). Further, the status indicator of module B (402) is set to 6 to indicate all phases of the initialization process have been successfully completed on module B (402).

The initialization process then selects the next module, module D (406) from the module initialization queue (408). Phase 1 is successfully performed on module D (406) followed by the first graph walking phase, phase 2. As is shown in FIG. 4G, after phase 1 is performed, the dependency graph (410) is unchanged as module D (406) has no direct dependent modules. When the graph walking phase, phase 2, is performed on the transitive closure of the dependency graph of module D (406), the outcome is clearly that phase 1 has been performed on all dependent modules of module D (406) as module D (406) has no dependent modules. Therefore, module D (406) is permitted to advance to the next processing phase in the initialization process, phase 3.

Phase 3 is performed on module D (406) in which any direct dependent modules of module D (406) are checked for name conflicts. Upon successful completion of phase 3, the second graph walking phase, phase 4, is performed on the transitive closure of the dependency graph of module D (406). The outcome of the phase 4 graph walk is clearly that phase 3 has been performed on all dependent modules of module D (406). Therefore, module D (406) is permitted to advance to the next processing phase in the initialization process, phase 5.

Phase 5 is performed on module D (406) in which a module initializer class, if one is specified, is to be executed. Module D (406) does not includes a module initializer class so none is executed. Upon successful completion of phase 5, the third graph walking phase, phase 6, is performed on the transitive closure of the dependency graph of module D (406). The outcome of the phase 6 graph walk is clearly that phase 5 has been performed on all dependent modules of module D (406). Therefore, module D (406) has successfully completed all of the initialization phases. As shown in FIG. 4G, module D (406) is removed from the module initialization queue (408). Further, the status indicator of module D (406) is set to 6 to indicate all phases of the initialization process have been successfully completed on module D (406).

The initialization process has now reached the end of the module initialization queue (408). The progress indicator flag is checked to see if progress was made in initializing any module in the module initialization queue (408). The process indicator flag is currently set to True, so progress has been made. The progress indicator flag is set to False and the initialization process starts again with the first module in the module initialization queue (408).

The initialization process thus selects module A (402) from the module initialization queue (408). The status indicator of module A (400) indicates that the last processing phase performed on module A (400) was phase 1, so the first graph walking phase, phase 2, is performed on the transitive closure of the dependency graph of module A (400) again to determine whether module A (400) is permitted to progress to the next processing phase. The outcome of performing the graph walk is that the direct dependent modules of module A (400), module B (402) and module C (404), and the indirect dependent module of module A (400), module D (406), have all completed phase 1. Therefore, module A (400) is permitted to advance to the next processing phase in the initialization process, phase 3 and the progress indicator flag is also set to True to indicate that initialization progress has been made.

Figures 4H, 4I:
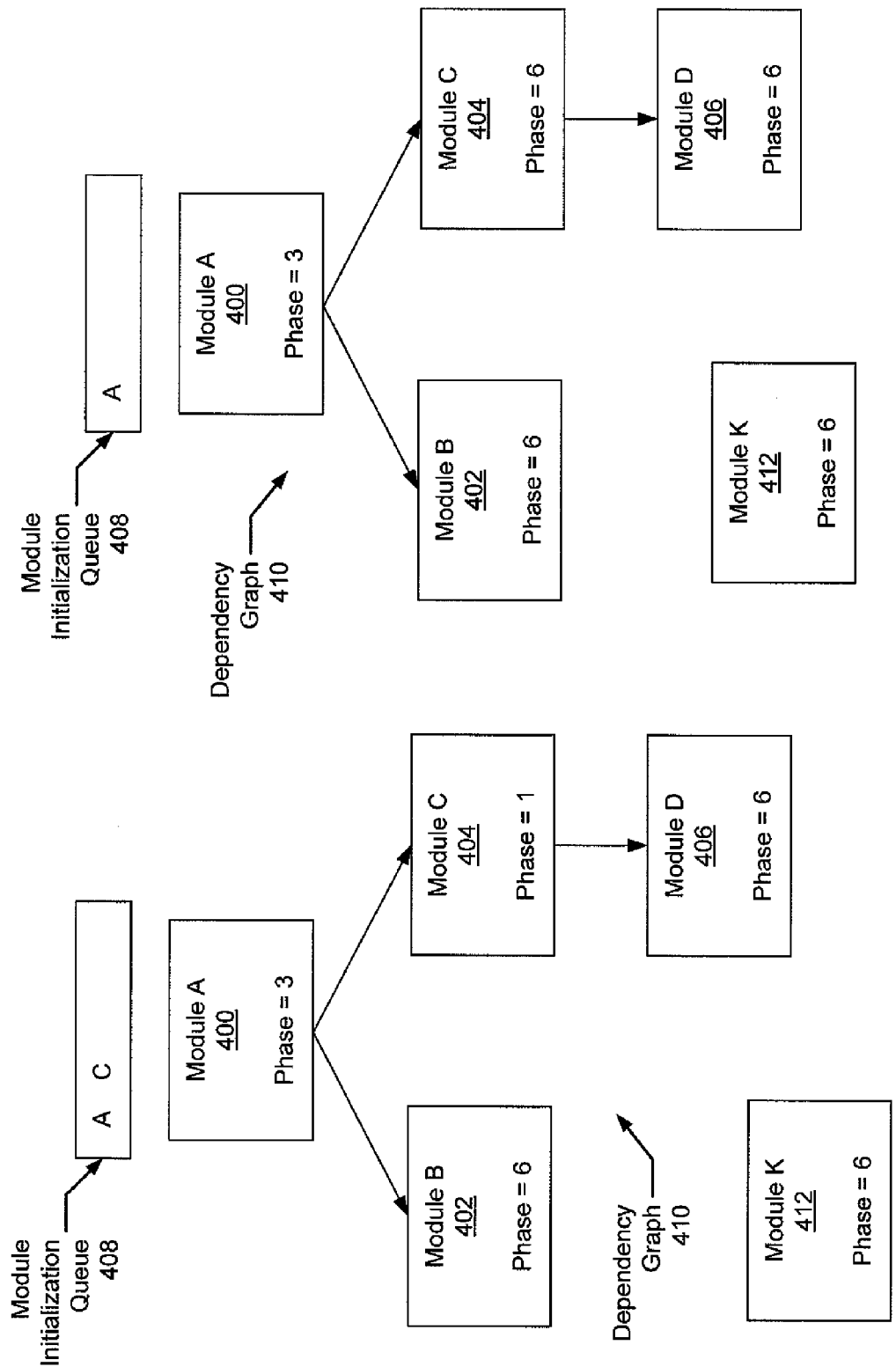

Phase 3 is performed on module A (400) in which any direct dependent modules of module A (400) are checked for name conflicts. Upon successful completion of phase 3, the second graph walking phase, phase 4, is performed on the transitive closure of the dependency graph of module A (400). The outcome of the phase 4 graph walk is that phase 3 has not been performed on one of the dependent modules of module A (400), i.e., module C (404). Therefore, module A (400) is not permitted to advance to the next processing phase in the initialization process. As shown in FIG. 4H, the status indicator of module A (400) is set to 3 to indicate that phase 3 was successfully completed on module A (400). The initialization process then moves to the next module in the module initialization queue (408).

The initialization process thus selects module C (404) from the module initialization queue (408). The status indicator of module C (404) indicates that the last processing phase performed on module C (404) was phase 1, so the first graph walking phase, phase 2, is performed on the transitive closure of the dependency graph of module C (404) again to determine whether module C (404) is permitted to progress to the next processing phase. The outcome of the graph walking phase is that the direct dependent module of module C (404), module D (406), has successfully completed the last processing phase performed on module C (404), i.e., phase 1. Therefore, module C (404) is permitted to advance to the next processing phase in the initialization process, phase 3.

Phase 3 is performed on module C (404) in which any direct dependent modules of module C (404) are checked for name conflicts. Upon successful completion of phase 3, the second graph walking phase, phase 4, is performed on the transitive closure of the dependency graph of module C (404). The outcome of the phase 4 graph walk is clearly that phase 3 has been performed on all dependent modules of module C (404). Therefore, module C (404) is permitted to advance to the next processing phase in the initialization process, phase 5.

Phase 5 is performed on module C (404) in which a module initializer class, if one is specified, is to be executed. Module C (404) does not includes a module initializer class so none is executed. Upon successful completion of phase 5, the third graph walking phase, phase 6, is performed on the transitive closure of the dependency graph of module C (404). The outcome of the phase 6 graph walk is clearly that phase 5 has been performed on all dependent modules of module C (404). Therefore, module C (404) has successfully completed all of the initialization phases. As shown in FIG. 4I, module C (404) is removed from the module initialization queue (408). Further, the status indicator of module C (404) is set to 6 to indicate all phases of the initialization process have been successfully completed on module C (404).

The initialization process has again reached the end of the module initialization queue (408). The progress indicator flag is checked to see if progress was made in initializing any module in the module initialization queue (408). The process indicator flag is currently set to True, so progress has been made. The progress indicator flag is set to False and the initialization process starts again with the first module in the module initialization queue (408).

The initialization process thus selects module A (400) from the module initialization queue (408). The status indicator of module A (400) indicates that the last processing phase performed on module A (400) was phase 3, so the second graph walking phase, phase 4, is performed on the transitive closure of the dependency graph of module A (400) again to determine whether module A (400) is permitted to progress to the next processing phase. The outcome of the graph walking phase is that all of the direct and indirect dependent modules of module A (400) have completed the last processing phase performed on module A (400), i.e., phase 3. Therefore, the progress indicator is set to True and module A (400) is permitted to advance to the next processing phase in the initialization process, phase 5.

Figure 4J:
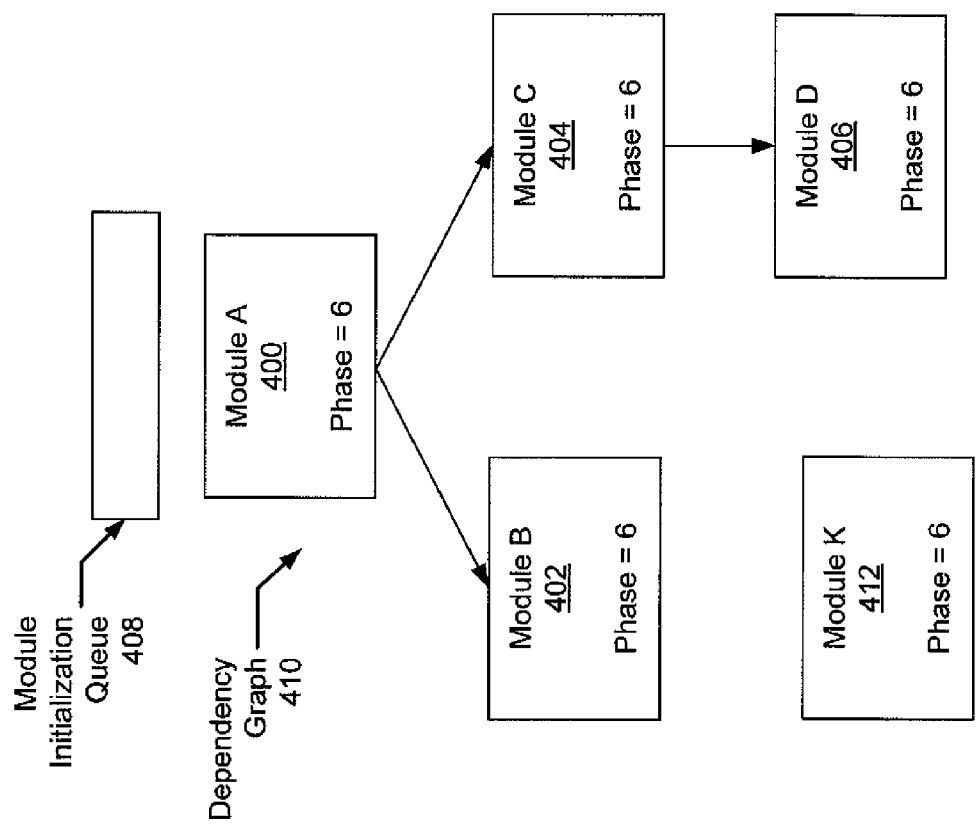

Phase 5 is performed on module A (400) in which a module initializer class, if one is specified, is to be executed. Module A (400) does not include a module initializer class so none is executed. Upon successful completion of phase 5, the third graph walking phase, phase 6, is performed on the transitive closure of the dependency graph of module A (400). The outcome of the phase 6 graph walk is clearly that phase 5 has been performed on all dependent modules of module A (400). Therefore, module A (400) has successfully completed all of the initialization phases. As shown in FIG. 4J, module A (400) is removed from the module initialization queue (408). Further, the status indicator of module A (400) is set to 6 to indicate all phases of the initialization process have been successfully completed on module A (400).

Figure 5:
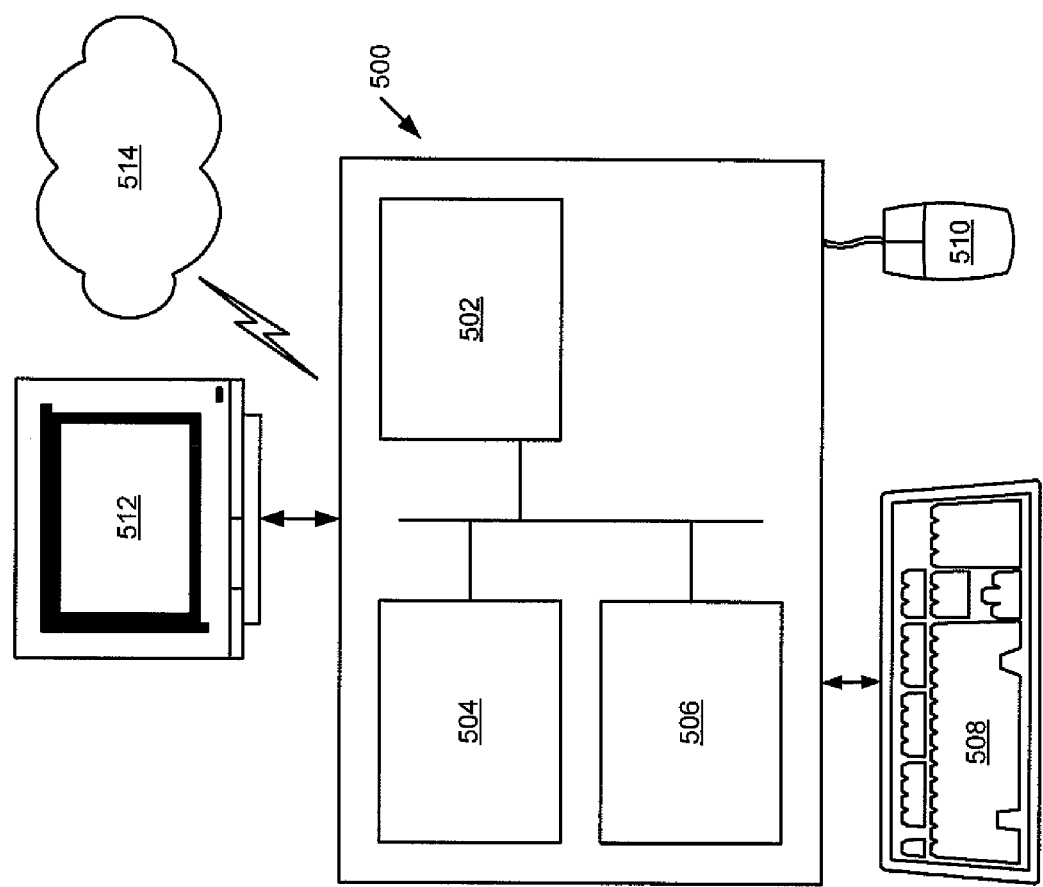
FIG. 5 shows a diagram of a computer system in accordance with one or more embodiments of the invention.

Embodiments of the invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) may be connected to a network (514) (e.g., a local area network (LAN), a wide area network (WAN) such as the Internet, or any other similar type of network) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention (e.g., module system, module storage, module cache, etc.) may be located on a different node within the distributed system. In one embodiment of the invention, the node may be a computer system. Alternatively, the node may be a processor with associated physical memory. The node may alternatively be a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for initializing a module comprising:
   identifying a module for initialization, wherein the module is dependent on a plurality of modules and wherein the plurality of modules is listed in a dependency graph of the module; and
   performing a plurality of processing phases on the module and the plurality of modules in the dependency graph, wherein the performing comprises, for each module:
      executing a processing phase of the plurality of processing phases on the module;
      determining whether the processing phase has been executed on each of the plurality of modules in the dependency graph of the module, wherein determining whether the processing phase has been executed comprises walking the dependency graph of the module to determine an initialization status of each of the modules in the dependency graph, wherein the initialization status indicates which processing phase of the plurality of processing phases was last performed on a module; and
      when the processing phase has been executed on each of the modules in the dependency graph of the module, executing a subsequent processing phase of the plurality of processing phases on the module,
   wherein at least one processing phase of the plurality of processing phases comprises executing custom initialization code.

2. The method of claim 1, wherein executing the custom initialization code comprises:
   initializing another module.

3. The method of claim 2, wherein initializing the custom code further comprises:
   removing the module from a module initialization queue before initializing the another module, wherein the module initialization queue comprises modules currently being initialized; and
   adding the another module to the module initialization queue; and
   wherein determining whether the another module depends on the module further comprises:

monitoring initialization progress of modules in the module initialization queue; and determining that the another module depends on the module when no module in the module initialization is able to progress.

4. The method of claim 1, wherein the custom initialization code is specified by one selected from a group consisting of a module definition of a module and an application causing the initialization of the module.

5. The method of claim 1, wherein executing the processing phase further comprises one selected from a group consisting of identifying all modules on which the module directly depends and performing a conflict check on all modules upon which the module directly depends.

6. The method of claim 5, wherein identifying all modules comprises executing custom initialization code to identify the modules.

7. A module system comprising:
module storage configured to store a plurality of module definitions; and
a module initialization engine configured to initialize a module created from a module definition of the plurality of module definitions by:
performing a plurality of processing phases on the module and a plurality of modules in a dependency graph of the module, wherein the module is dependent on the plurality of modules in the dependency graph of the module and wherein the performing comprises, for each module:
executing a processing phase of the plurality of processing phases on the module;
determining whether the processing phase has been executed on all modules in a dependency graph of the module, wherein determining whether the processing phase has been executed comprises walking the transitive closure of a dependency graph of the module to determine an initialization status of each of the modules in the dependency graph, wherein the initialization status indicates which processing phase of the plurality of processing phases was last performed on a module; and
when the processing phase has been executed for all modules in the dependency graph of the module, executing a subsequent processing phase of the plurality of processing phases on the module,
wherein at least one processing phase of the plurality of processing phases comprises executing custom initialization code.

8. The system of claim 7, wherein executing the custom initialization code comprises:
initializing another module created from a module definition of the plurality of module definitions.

9. The system of claim 8, wherein executing the custom initialization code further comprises:

a module initialization queue configured to store modules being initialized, and
wherein the performing further comprises:
removing the module from the module initialization queue before initializing the another module; and
adding the another module to the module initialization queue; and
wherein determining whether the another module depends on the module further comprises:
monitoring initialization progress of modules in the module initialization queue; and
determining that the another module depends on the module when no module in the module initialization is able to progress.

10. The system of claim 7, wherein the custom initialization code is specified by one selected from a group consisting of a module definition of the module and an application causing the initialization of the module.

11. The system of claim 7, wherein executing the processing phase further comprises one selected from a group consisting of identifying all modules on which the module directly depends and performing a conflict check on all modules upon which the module directly depends.

12. The system of claim 11, wherein identifying all modules comprises executing custom initialization code to identify the modules.

13. A non-transitory computer readable medium comprising executable instructions to initialize a module by:
identifying a module for initialization, wherein the module is dependent on a plurality of modules and wherein the plurality of modules is listed in a dependency graph of the module; and
performing a plurality of processing phases on the module and the plurality of modules in the dependency graph, wherein the performing comprises, for each module:
executing a processing phase of the plurality of processing phases on the module;
determining whether the processing phase has been executed on all modules in a dependency graph of the module, wherein determining whether the processing phase has been executed comprises walking the dependency graph of the module to determine an initialization status of each of the modules in the dependency graph, wherein the initialization status indicates which processing phase of the plurality of processing phases was last performed on a module; and
when the processing phase has been executed for all modules in the dependency graph of the module, executing a subsequent processing phase of the plurality of processing phases on the module,
wherein at least one processing phase of the plurality of processing phases comprises executing custom initialization code.

* * * * *